(12) United States Patent
Mizoguchi (10) Patent No.: US 9,794,530 B2
(45) Date of Patent: Oct. 17, 2017

(54) OPTICAL DEVICE AND IMAGE DISPLAY DEVICE

(71) Applicant: Seiko Epson Corporation, Tokyo (JP)

(72) Inventor: Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 79 days.

(21) Appl. No.: 15/010,175

(22) Filed: Jan. 29, 2016

(65) Prior Publication Data

US 2016/0227176 A1 Aug. 4, 2016

(30) Foreign Application Priority Data

Jan. 30, 2015 (JP) .................................. 2015-017657

(51) Int. Cl.
*G02B 26/08* (2006.01)
*H04N 9/31* (2006.01)
*G03B 21/14* (2006.01)
*G03B 21/00* (2006.01)

(52) U.S. Cl.
CPC ......... *H04N 9/3102* (2013.01); *G02B 26/085* (2013.01); *G02B 26/0875* (2013.01); *G03B 21/005* (2013.01); *G03B 21/142* (2013.01); *H04N 9/317* (2013.01); *H04N 9/3188* (2013.01)

(58) Field of Classification Search
USPC ...................... 359/199.1–199.4, 200.6–200.8, 359/209.1–210.2, 224.1–224.2; 310/36, 310/38
See application file for complete search history.

(56) References Cited

U.S. PATENT DOCUMENTS

| 8,294,969 | B2 * | 10/2012 | Plesko | G02B 26/105 |
| | | | | 359/199.3 |
| 2011/0234650 | A1 | 9/2011 | Watanabe | |
| 2012/0033280 | A1 * | 2/2012 | Mizoguchi | G02B 26/085 |
| | | | | 359/199.3 |

FOREIGN PATENT DOCUMENTS

JP 2011-158589 A 8/2011
JP 2011-203460 A 10/2011

* cited by examiner

*Primary Examiner* — James Phan
(74) *Attorney, Agent, or Firm* — Harness, Dickey & Pierce, P.L.C.

(57) ABSTRACT

An optical device includes a glass plate, a movable section that supports the glass plate, a shaft section that supports the movable section so as to be swingable around the swing axis, a support section that supports the shaft section, a permanent magnet that is provided in the movable section and is thinner than the glass plate, and a pair of coils that are disposed opposite to each other with the permanent magnet interposed therebetween. The movable section includes thin wall portions that are thinner than the glass plate. The permanent magnet is disposed in the thin wall portions. In side view, the surface of each of the coils on the permanent magnet side is located between both the main surfaces of the glass plate.

16 Claims, 9 Drawing Sheets

OPTICAL DEVICE AND IMAGE DISPLAY DEVICE

BACKGROUND

1. Technical Field

The present invention relates to an optical device and an image display device.

2. Related Art

In order to make the resolution of a projected image higher than the resolution of a light modulation device, such as a liquid crystal panel, a technique for shifting the axis of image light emitted from the light modulation device has been known. In addition, as a device for shifting the axis of image light, an optical path control device disclosed in JP-A-2011-158589 is known. The optical path control device disclosed in JP-A-2011-158589 includes a glass plate, a movable section for holding the glass plate, a support section for supporting the movable section, and a pair of leaf springs for connecting the support section and the movable section to each other. By changing the position of the glass plate by rotating the movable section using the leaf springs as a rotary axis, light (image light) incident on the glass plate is refracted to shift the axis. In the optical path control device disclosed in JP-A-2011-158589, electromagnetic driving using a coil and a permanent magnet is adopted for a driving mechanism for rotating the movable section.

In the optical path control device disclosed in JP-A-2011-158589, however, a yoke is used to guide the magnetic field generated by the coil, and the yoke protrudes up and down. Accordingly, there is a problem in that the device becomes large in size by the amount of protrusion.

SUMMARY

An advantage of some aspects of the invention is to provide an optical device that can be made thin and an image display device including the optical device.

The advantage can be achieved by the invention described below.

An optical device according to an aspect of the invention includes: a plate-shaped optical section that has a light incidence surface on which light is incident; a movable section that supports the optical section; a shaft section that supports the movable section so as to be swingable around a swing axis; a support section that supports the shaft section; a permanent magnet that is provided in the movable section and has a smaller thickness than a thickness of the optical section; and a pair of coils that are disposed opposite to each other with the permanent magnet interposed therebetween and that generate a magnetic field to act on the permanent magnet. The movable section includes a thin wall portion having a smaller thickness than the thickness of the optical section. The permanent magnet is disposed in the thin wall portion. When seen from a direction perpendicular to a plate thickness direction of the optical section, a surface of each of the pair of coils facing the permanent magnet is located between a pair of main surfaces of the optical section.

With this configuration, it is possible to reduce the thickness of the optical device.

In the optical device according to the aspect of the invention, it is preferable that a center of the shaft section in the plate thickness direction and a center of the permanent magnet in the plate thickness direction are located within the same plane perpendicular to the plate thickness direction of the optical section.

With this configuration, since it is possible to smoothly swing the movable section, the driving characteristics are improved.

In the optical device according to the aspect of the invention, it is preferable that the same plane crosses a center of the optical section in the plate thickness direction.

With this configuration, since it is possible to more smoothly swing the movable section, the driving characteristics are further improved.

In the optical device according to the aspect of the invention, it is preferable that each of the movable section and the shaft section contains a resin material.

With this configuration, since it is possible to make the structure around the shaft section soft, it is possible to reduce the resonance frequency while achieving miniaturization. In addition, it is possible to suppress the change of the swing trajectory of the movable section with respect to the environmental temperature.

In the optical device according to the aspect of the invention, it is preferable to further include a first holding section that is fixed to the support section and holds one of the coils and a second holding section that is fixed to the support section and holds the other coil. In addition, it is preferable that the support section is interposed between the first and second holding sections.

With this configuration, it is easy to hold the coils. In addition, since the first and second holding sections also function as a reinforcing member for reinforcing the support section, it is possible to reduce the bending of the support section or the like.

In the optical device according to the aspect of the invention, it is preferable that each of the first and second holding sections is a non-magnetic material.

With this configuration, since the formation of the magnetic path by the first and second holding sections is suppressed, the magnetic field generated from the coils can be efficiently made to act on the permanent magnet.

In the optical device according to the aspect of the invention, it is preferable that a surface of each of the pair of coils facing the permanent magnet is spaced apart from the permanent magnet in the plate thickness direction.

With this configuration, since the inner periphery of each coil can be made smaller, it is possible to increase the magnetic field generation efficiency.

In the optical device according to the aspect of the invention, it is preferable that the light is transmitted through the optical section.

With this configuration, it is possible to shift the optical axis of light using the refraction of the optical section.

An image display device according to another aspect of the invention includes the optical device according to the aspect of the invention, and a position of each pixel displayed by irradiation of the light is shifted by spatially modulating light in the optical device.

With this configuration, an image display device having excellent display characteristics is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an optical device and an image display device according to the invention will be described in detail based on each embodiment shown in the accompanying diagrams.

First Embodiment

Figure 1:
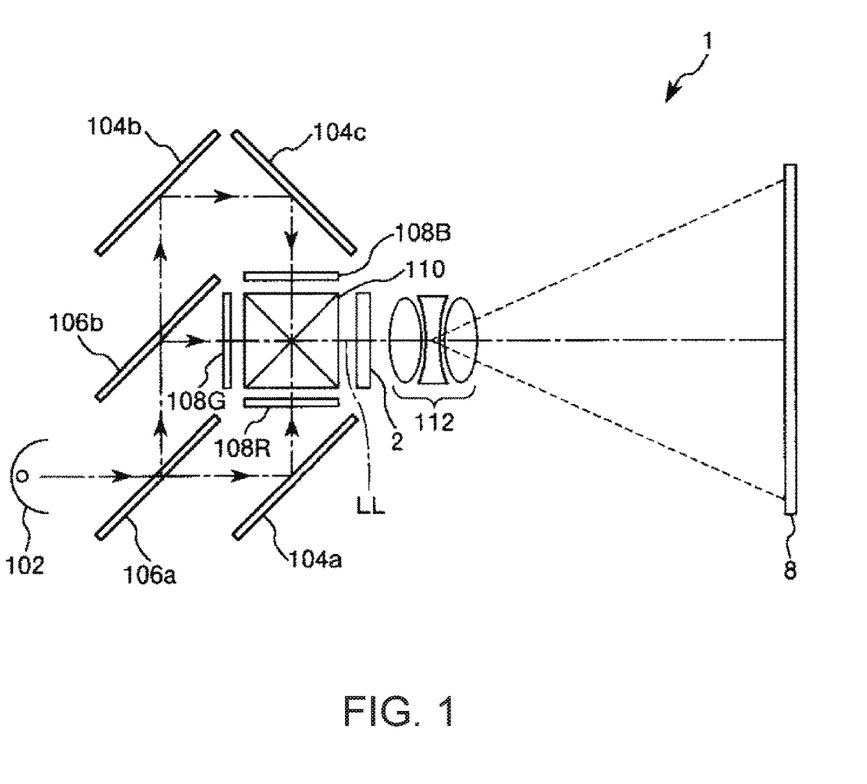
FIG. 1 is a diagram showing the optical configuration of an image display device according to a first embodiment of the invention.
Figure 2:
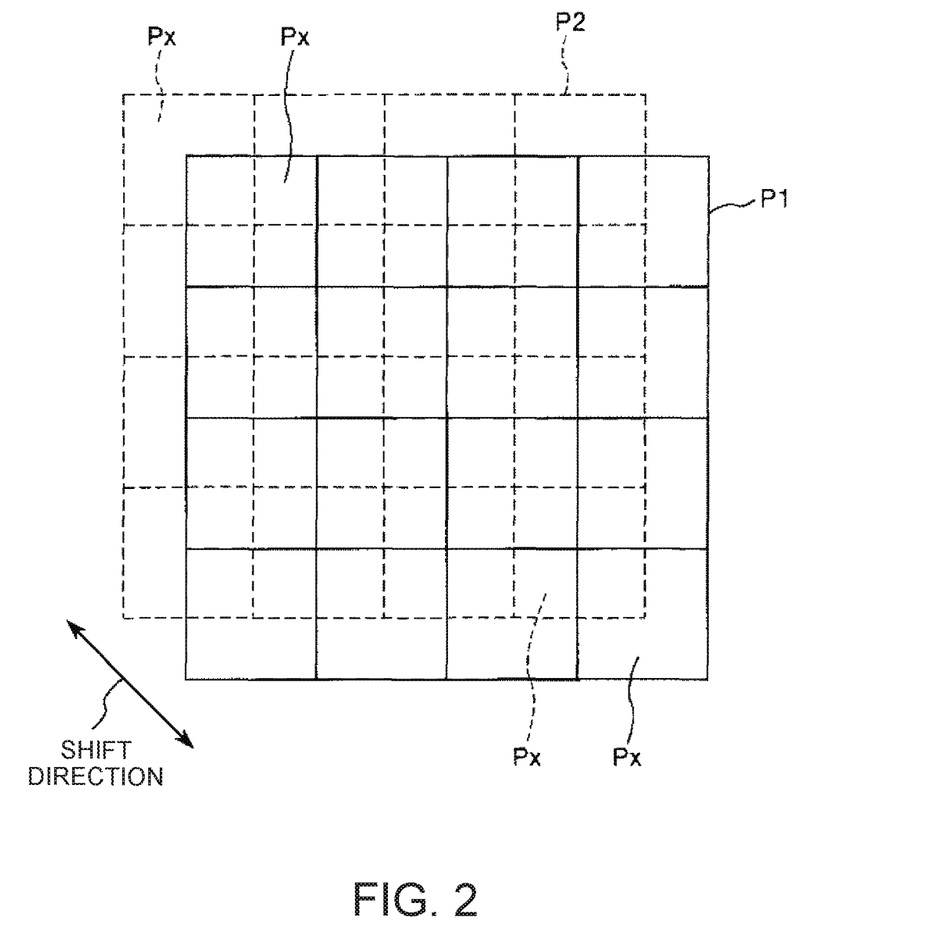
FIG. 2 is a diagram showing a state obtained by shifting image light.
Figure 3:
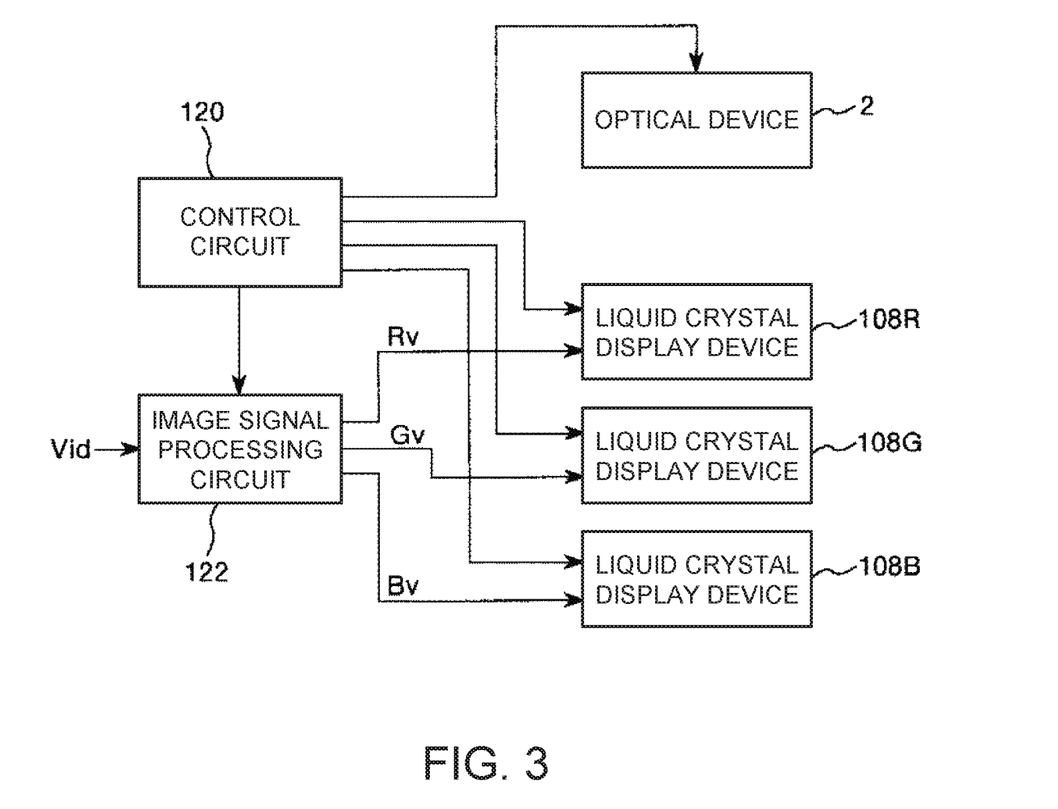
FIG. 3 is a block diagram showing the electrical configuration of the image display device shown in FIG. 1.
Figure 4A:
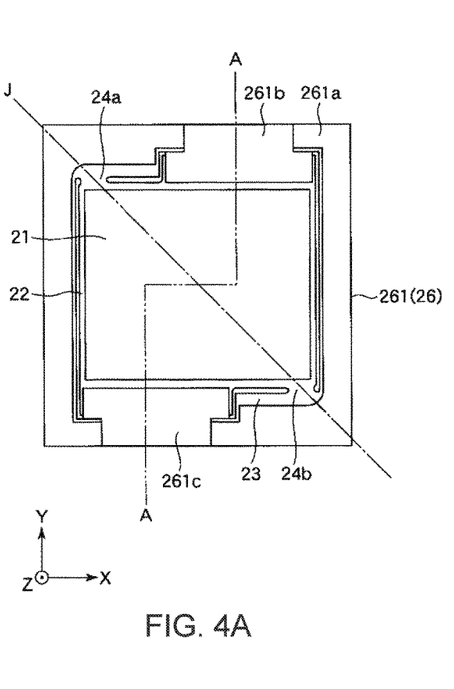
FIGS. 4A and 4B are a top view and a bottom view of an optical device provided in the image display device shown in FIG. 1.
Figure 4B:
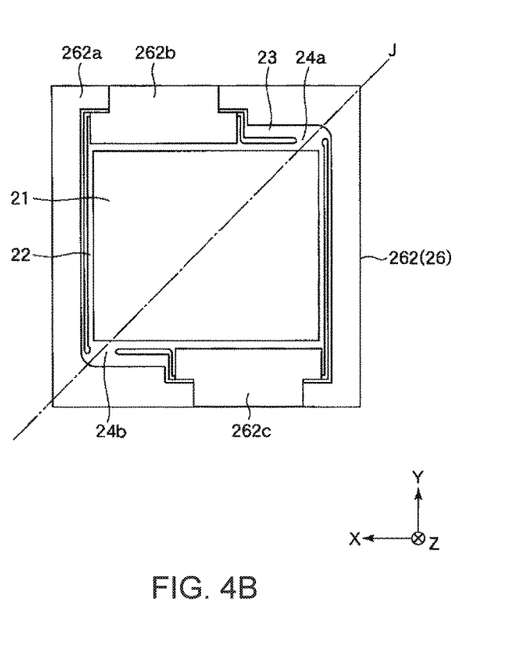
Figure 5:
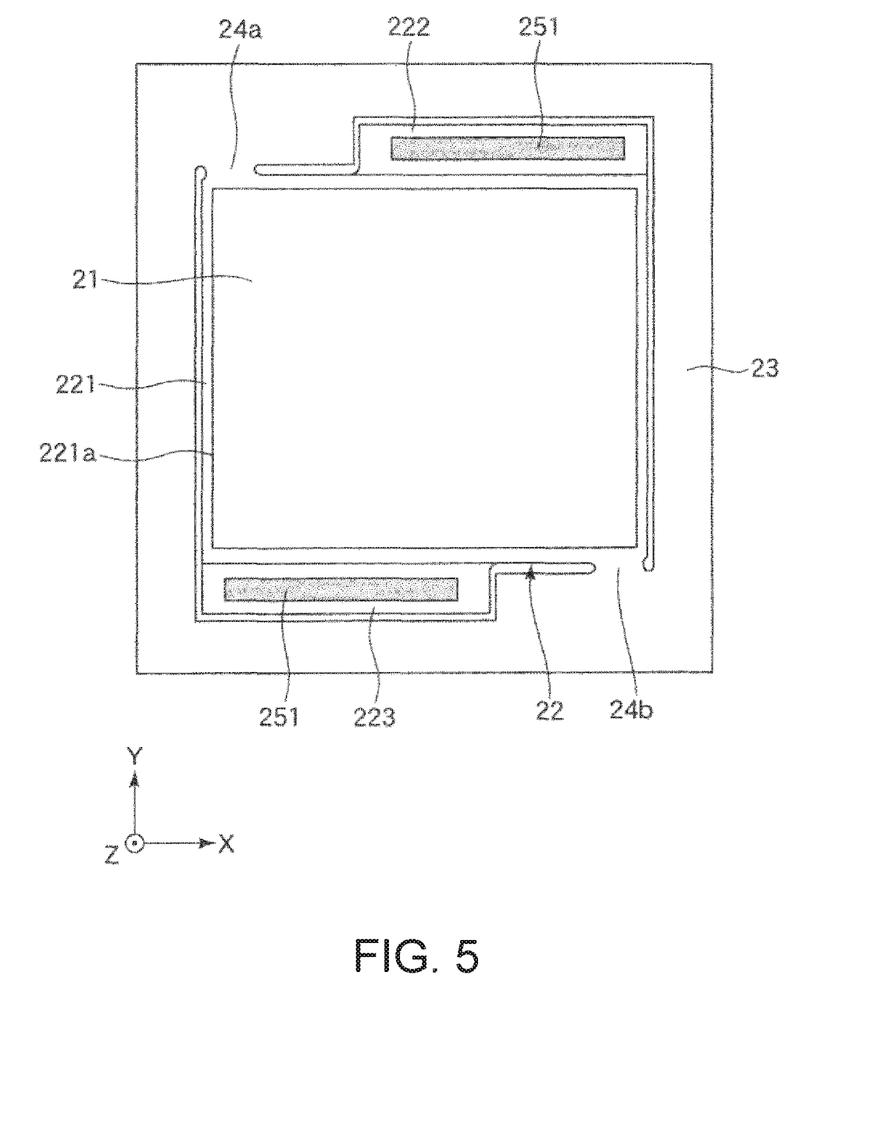
FIG. 5 is a top view of the optical device shown in FIGS. 4A and 4B.
Figure 6:
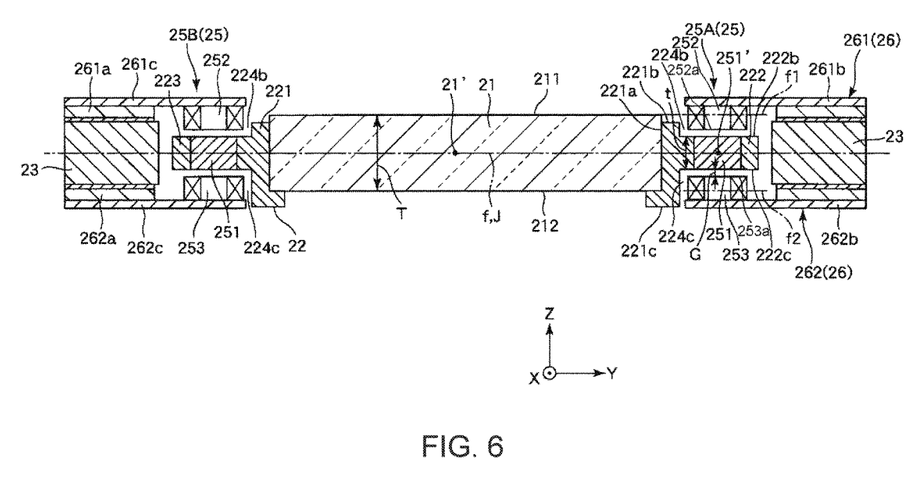
FIG. 6 is a sectional view taken along the line A-A of FIG. 4A.
Figure 7:
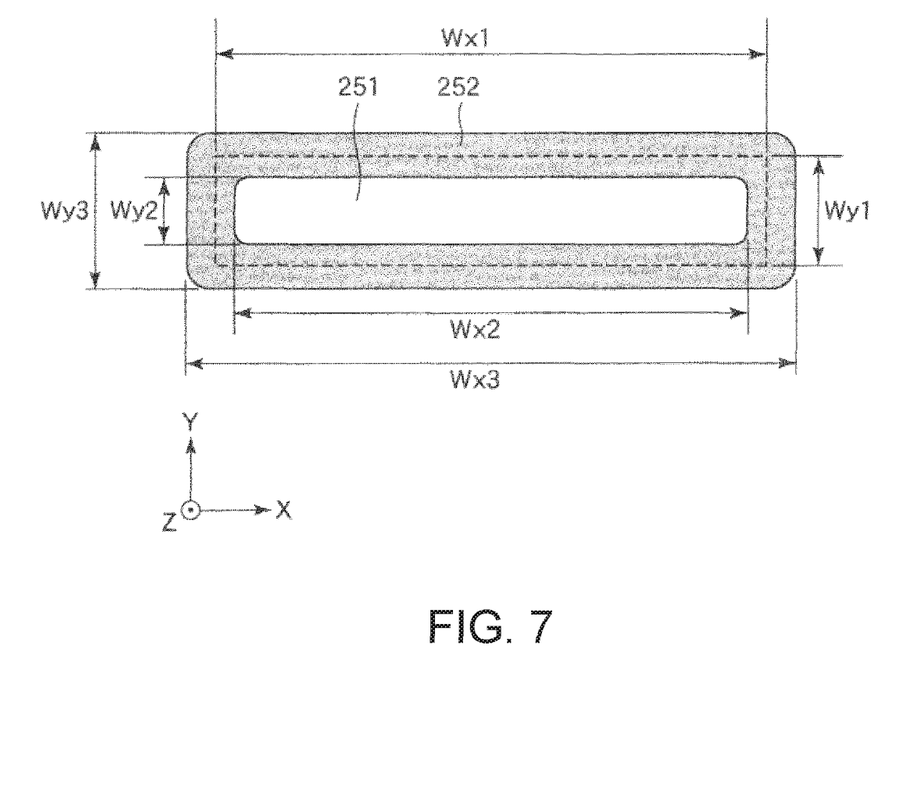
FIG. 7 is a plan view showing the arrangement of a permanent magnet and a coil.

FIG. 1 is a diagram showing the optical configuration of an image display device according to a first embodiment of the invention. FIG. 2 is a diagram showing a state obtained by shifting image light. FIG. 3 is a block diagram showing the electrical configuration of the image display device shown in FIG. 1. FIGS. 4A and 4B are a top view and a bottom view of an optical device provided in the image display device shown in FIG. 1. FIG. 5 is a top view of the optical device shown in FIGS. 4A and 4B. FIG. 6 is a sectional view taken along the line A-A of FIG. 4A. FIG. 7 is a plan view showing the arrangement of a permanent magnet and a coil.

A holding section of the optical device is not shown in FIG. 5. In FIGS. 4A to 7, for convenience of explanation, an X axis, a Y axis, and a Z axis are shown as three axes perpendicular to each other, and a distal end side and a base end side of the shown arrow is assumed to be "+side" and "−side", respectively. In addition, in the following, a direction parallel to the X axis is also referred to as "X-axis direction", a direction parallel to the Y axis is also referred to as "Y-axis direction", a direction parallel to the Z-axis direction is also referred to as "Z-axis direction", and +Z side and −Z side are also referred to as "up" and "down", respectively.

1. Projector

A projector (image display device) 1 shown in FIG. 1 is an LCD projector. As shown in FIG. 1, the projector 1 includes a light source 102, mirrors 104a, 104b, and 104c, dichroic mirrors 106a and 106b, liquid crystal display devices 108R, 108G, and 108B, a dichroic prism 110, an optical device 2 as an optical path deflection element, and a projection lens system 112.

As the light source 102, for example, a halogen lamp, a mercury lamp, and a light emitting diode (LED) or the like can be mentioned. In addition, the light source 102 that emits white light is used. The light emitted from the light source 102 is first separated into red light (R) and the other light by the dichroic mirror 106a. The red light is reflected by the mirror 104a and is then incident on the liquid crystal display device 108R, and the other light is further separated into green light (G) and blue light (B) by the dichroic mirror 106b. Then, the green light is incident on the liquid crystal display device 108G, and the blue light is incident on the liquid crystal display device 108B after being reflected by the mirrors 104b and 104c.

The liquid crystal display devices 108R, 108G, and 108B are used as spatial light modulators. The liquid crystal display devices 108R, 108G, and 108B are transmission type spatial light modulators corresponding to the primary colors of R, G, and B, respectively. For example, each of the liquid crystal display devices 108R, 108G, and 108B includes pixels arranged in a matrix of 1080 rows×1920 columns. The amount of transmitted light with respect to incident light is adjusted in each pixel, and the light amount distribution of all the pixels is cooperatively controlled in the liquid crystal display devices 108R, 108G, and 108B. Light beams that are spatially modulated by the liquid crystal display devices 108R, 108G, and 108B are combined by the dichroic prism 110, and full-color image light LL is emitted from the dichroic prism 110. Then, the emitted image light LL is projected onto a screen 8 after being magnified by the projection lens system 112.

The projector 1 includes the optical device 2 between the dichroic prism 110 and the projection lens system 112. Therefore, by shifting the optical axis of the image light LL using the optical device 2 (by performing so-called "pixel shifting"), an image with a higher resolution (4K if the liquid crystal display devices 108R, 108G, and 108B are full high-definition) than the resolution of the liquid crystal display devices 108R, 108G, and 108B can be projected onto the screen 8. This principle will be briefly described with reference to FIG. 2. The optical device 2 includes a glass plate 21 through which the image light LL is transmitted. By changing the position of the glass plate 21, the optical axis of the image light LL can be shifted by using refraction.

By using such a shift of the optical axis, the projector 1 is configured such that an image display position P1 when shifting the optical axis of the image light LL to one side and an image display position P2 when shifting the optical axis of the image light LL to the other side are shifted by a half pixel (that is, half of a pixel Px) in the oblique direction (arrow direction in FIG. 2) on the screen 8. By alternately displaying an image on the image display positions P1 and P2, the apparent number of pixels is increased. Accordingly, the resolution of the image projected onto the screen 8 is increased. The amount of shift of the image display positions P1 and P2 is not limited to the half pixel. For example, the amount of shift of the image display positions P1 and P2 may be ¼ of the pixel Px, or may be ¾ of the pixel Px.

In addition to the optical device 2 or the liquid crystal display devices 108R, 108G, and 108B, the projector 1 having such a configuration includes a control circuit 120 and an image signal processing circuit 122 as shown in FIG. 3. The control circuit 120 controls an operation of writing the data signal onto the liquid crystal display devices 108R, 108G, and 108B, an optical path deflecting operation in the optical device 2, a data signal generating operation in the image signal processing circuit 122, and the like. On the other hand, the image signal processing circuit 122 separates an image signal Vid supplied from an external device (not shown) into signals corresponding to three primary colors of R, G, and B, and converts the signals into data signals Rv, Gv, and Bv suitable for the operations of the liquid crystal display devices 108R, 108G, and 108B. Then, the converted data signals Rv, Gv, and Bv are supplied to the liquid crystal display devices 108R, 108G, and 108B, respectively, and the liquid crystal display devices 108R, 108G, and 108B operate based on the data signals Rv, Gv, and Bv.

2. Optical Device

Next, the optical device 2 provided in the projector 1 will be described in detail.

As shown in FIGS. 4A to 6, the optical device 2 includes: a structure including a movable section 22 in which a glass plate (optical section) 21 that has a light-transmissive property and deflects the image light LL is provided, a frame-shaped support section 23 provided around the movable section 22, and shaft sections 24a and 24b that are connected to the movable section 22 and the support section 23 and that support the movable section 22 with respect to the support section 23 so as to be swingable (rotatable) around a swing axis J; a driving mechanism 25 for swinging the movable section 22 with respect to the support section 23; and a holding section 26 for holding coils 252 and 253 provided in the driving mechanism 25. The optical device 2 having such a configuration is disposed in the projector 1 such that the +Z side is the dichroic prism 110 side and the −Z side is the projection lens system 112 side, for example. However, the direction of the optical device 2 may be reversed.

The movable section 22 includes a glass plate support section 221 that has a flat plate shape and supports the glass plate 21 and thin wall portions 222 and 223 that are provided on the outer side of the glass plate support section 221 and are thinner than the glass plate support section 221.

The glass plate support section 221 includes a through hole 221a in the central portion. The glass plate 21 is fitted into the through hole 221a, so that the glass plate 21 is bonded to the glass plate support section 221 by an adhesive, for example. The through hole 221a has a stepped portion (claw) on the periphery, and the glass plate 21 is housed in the stepped portion (claw). Thus, the arrangement of the glass plate 21 in the glass plate support section 221 is simplified.

The glass plate 21 has a rectangular shape in a plan view. The glass plate 21 can transmit the incident image light LL while refracting the incident image light LL when the incidence angle of the image light LL is tilted from 0°. Accordingly, by changing the position of the glass plate 21 so that the target incidence angle is obtained, it is possible to control the deflection direction and the deflection amount of the image light LL. The size of the glass plate 21 can be appropriately set so that the image light LL emitted from the dichroic prism 110 can be transmitted through the glass plate 21. In addition, it is preferable that the glass plate 21 is substantially colorless and transparent. In addition, an anti-reflection film may be formed on an incidence surface and an emission surface of the image light LL of the glass plate 21.

The material of the glass plate 21 is not particularly limited. For example, various glass materials, such as white plate glass, borosilicate glass, and quartz glass, can be used. Although the glass plate 21 is used as an optical section in the present embodiment, the optical section is not particularly limited as long as the optical section is formed of a material that has a light-transmissive property and can refract the image light LL. In addition to glass, for example, the optical section may be formed of various crystalline materials, such as crystals and sapphire, and various resin materials, such as polycarbonate-based resin and acrylic-based resin. However, as an optical section, it is preferable to use the glass plate 21 as in the present embodiment. In this case, since it is possible to increase the rigidity of the optical section in particular, the deflection unevenness of the image light LL deflected in the optical section can be particularly suppressed.

The thin wall portions 222 and 223 are connected to the outer periphery of the glass plate support section 221 on which the glass plate 21 is supported. The thin wall portions 222 and 223 are located on the opposite sides with respect to the swing axis J.

As shown in FIG. 6, the thin wall portion 222 has a thickness t smaller than the thickness T of the glass plate 21. The thin wall portion 222 is located between one main surface (surface on the +Z-axis side) 221b and the other main surface (surface on the −Z-axis side) 221c of the glass plate support section 221 in a plan view seen from the plane direction (direction perpendicular to the thickness direction of the glass plate 21) of the XY plane. Therefore, a stepped portion 224b is formed between one main surface 222b of the thin wall portion 222 and the main surface 221b, and a stepped portion 224c is formed between the other main surface 222c of the thin wall portion 222 and the main surface 221c. In addition, the through hole 221a is formed in the thin wall portion 222, and a permanent magnet 251 provided in the driving mechanism 25 is fitted into the through hole 221a. The thin wall portion 223 has the same configuration as the thin wall portion 222. Accordingly, the explanation thereof will be omitted.

The frame-shaped support section 23 is provided around the movable section 22 having such a configuration, and the movable section 22 (glass plate support section 221) and the support section 23 are connected to each other by the shaft sections 24a and 24b. The shaft sections 24a and 24b are located so as to be shifted from each other in the X-axis direction and the Y-axis direction in a plan view, and form the swing axis J of the movable section 22. Accordingly, the movable section 22 swings around the swing axis J, which is inclined by about 45° with respect to both axes of the X and Y axes, and the position of the glass plate 21 changes with the swing. In particular, in the optical device 2, the shaft sections 24a and 24b are disposed point-symmetrically with respect to the center of the glass plate 21 in a plan view. Accordingly, the swinging balance of the movable section 22 is good. In addition, the inclination angle of the swing axis J with respect to the X axis (Y axis) is not limited to 45°.

The movable section 22, the support section 23, and the shaft sections 24a and 24b are integrally formed. Therefore, it is possible to increase the impact resistance or long-term durability in a boundary portion between the support section 23 and the shaft sections 24a and 24b and a boundary portion between the shaft sections 24a and 24b and the movable section 22.

The movable section 22, the support section 23, and the shaft sections 24a and 24b are formed of materials having a smaller Young's modulus than the material of the glass plate 21. It is preferable that these materials contain resin. More preferably, it is preferable to contain the resin as a main component. In this case, it is possible to effectively suppress a situation in which the stress generated due to the swinging of the movable section 22 leads to unnecessary vibration of the glass plate 21 itself. In addition, since the side surface of the glass plate 21 can be surrounded with the soft movable section 22, it is possible to suppress the stress generated in the glass plate 21 when changing the position of the glass plate 21. Therefore, it is possible to suppress unnecessary vibration that is generated in the glass plate 21 in accordance with the stress distribution. As a result, it is possible to prevent an image deflected by the glass plate 21 from being deflected in an unintended direction. In addition, it is possible to suppress the change of the swing trajectory of the movable section 22 with respect to the environmental temperature. In addition, for example, the shaft sections 24a and 24b and the peripheral portions can be made sufficiently soft. Therefore, it is possible to form the optical device 2 having a low resonance frequency (about 60 kHz).

The aforementioned resin is not particularly limited. For example, polyethylene, polypropylene, silicone, polyacetal, polyamide, polycarbonate, polyphenylene ether, polyethylene terephthalate, polybutylene terephthalate, polyarylate, polysulfone, polyether sulfone, polyphenylene sulfide, polyether ether ketone, polyimide, polyether imide, and fluorine resins can be mentioned. Materials containing at least one of these resins are used.

Next, the driving mechanism 25 for swinging the movable section 22 will be described. As shown in FIG. 6, the driving mechanism 25 includes a first driving mechanism 25A disposed corresponding to the thin wall portion 222 and a second driving mechanism 25B disposed corresponding to the thin wall portion 223. Since the first driving mechanism 25A and the second driving mechanism 25B have the same configuration, the first driving mechanism 25A will be representatively described, and the explanation of the second driving mechanism 25B will be omitted.

The first driving mechanism 25A is an electromagnetic actuator including the permanent magnet 251 fitted into the through hole of the thin wall portion 222 and a pair of coils 252 and 253 for generating the magnetic field to act on the permanent magnet 251. A pair of coils 252 and 253 are disposed opposite each other with the permanent magnet 251 interposed therebetween. In other words, a pair of coils 252 and 253 are disposed opposite each other with a portion, in which the permanent magnet 251 of the movable section 22 is provided, interposed therebetween. Thus, by using the electromagnetic actuator, it is possible to generate a sufficient force to swing the movable section 22 with a simple structure. As a result, it is possible to swing the movable section 22 smoothly.

The permanent magnet 251 has a longitudinal shape along the X-axis direction, and is magnetized in the Z-axis direction (thickness direction of the glass plate 21). The permanent magnet 251 has a thickness approximately equal to the thickness t of the thin wall portion 222. Accordingly, the main surfaces of the permanent magnet 251 and the thin wall portion 222 on the +Z-axis side are even with each other, and the main surfaces of the permanent magnet 251 and the thin wall portion 222 on the −Z-axis side are even with each other. However, the thickness of the permanent magnet 251 is not particularly limited as long as the thickness of the permanent magnet 251 is smaller than the thickness of the glass plate 21, and the thickness of the permanent magnet 251 may be larger than the thickness of the thin wall portion 222 or may be smaller than the thickness of the thin wall portion 222.

The center 251' of the permanent magnet 251 in the Z-axis direction is located within the XY plane f including the swing axis J (the center of the shaft sections 24a and 24b in the Z-axis direction). In other words, the center 251' of the permanent magnet 251 and the swing axis J are located within the same XY plane f. In addition, the center 21' of the glass plate 21 in the Z-axis direction is also located within the XY plane f. Thus, by locating the centers 251' and 21' of the permanent magnet 251 and the glass plate 21 in the Z-axis direction within the XY plane f, the swinging of the movable section 22 around the swing axis J can be performed more smoothly. Therefore, it is possible to obtain the optical device 2 with better driving characteristics. However, the positions of the centers 251' and 21' are not limited thereto, and may be shifted from the XY plane f.

The permanent magnet 251 is not particularly limited, and it is possible to use a neodymium magnet, a ferrite magnet, a samarium cobalt magnet, and an alnico magnet, for example.

On the other hand, the coils 252 and 253 are disposed opposite each other with the permanent magnet 251 interposed therebetween. More specifically, the coil 252 is disposed on the +Z-axis side of the permanent magnet 251, and the coil 253 is disposed on the −Z-axis side.

In addition, in a plan view seen from the in-plane direction of the XY plane, the coils 252 and 253 are disposed so as to be spaced apart from the permanent magnet 251. In other words, each of the surfaces of the coils 252 and 253 facing the permanent magnet 251 is spaced apart from the permanent magnet 251. The distance (gap) between the coils 252 and 253 and the permanent magnet 251 is not particularly limited, and changes depending on the size of the movable section 22, the magnitude of the magnetic field generated from the coils 252 and 253, and the like. For example, the distance between the coils 252 and 253 and the permanent magnet 251 is preferably about 0.1 mm or more and 0.5 mm or less, and more preferably about 0.2 mm or more and 0.4 mm or less. Thus, the magnetic field generated from the coils 252 and 253 can be more efficiently made to act on the permanent magnet 251 while preventing contact between the permanent magnet 251 and the coils 252 and 253 at the time of swinging of the movable section 22. Therefore, it is possible to swing the movable section 22 more efficiently and stably.

In a plan view seen from the in-plane direction of the XY plane, a surface 252a of the coil 252 on the permanent magnet 251 side and a surface 253a of the coil 253 on the permanent magnet 251 side are located between the XY plane f1 including one main surface (surface on the +Z-axis side) 211 of the glass plate 21 and the XY plane f2 including the other main surface (surface on the −Z-axis side) 212 of the glass plate 21. In other words, the lower end of the coil 252 enters the stepped portion 224b, and the upper end of the coil 253 enters the stepped portion 224c. Through such a configuration, the protrusion of the coil 252 to the +Z-axis side and the protrusion of the coil 253 to the −Z-axis side are reduced. Therefore, it is possible to reduce the thickness of the optical device 2. In the present embodiment, only a part (lower end) of the coil 252 enters the stepped portion 224b. However, the entire coil 252 may enter the stepped portion 224b. This is the same for the coil 253.

The coils 252 and 253 are air-core coils. Therefore, it is possible to swing the movable section 22 more smoothly. Specifically, for example, when the coils 252 and 253 including the magnetic core disposed thereinside are used, the permanent magnet 251 may be attracted to the magnetic core depending on the strength of the generated magnetic force. In this case, since the swing axis J is displaced, the movable section 22 may not be able to swing smoothly. In order to prevent such a problem, it is preferable to use an air-core coil as the coils 252 and 253 as in the present embodiment.

The coil 252 has an approximately rectangular shape corresponding to the plan view shape of the permanent magnet 251 as shown in FIG. 7. Assuming that the width of the permanent magnet 251 in the long axis direction (X-axis direction) is Wx1, the width of the inner periphery of the coil 252 is Wx2, and the width of the outer periphery of the coil 252 is Wx3, the relationship of Wx2<Wx1<Wx3 is satisfied.

In addition, assuming that the width of the permanent magnet 251 in the short axis direction (Y-axis direction) is Wy1, the width of the inner periphery of the coil 252 is Wy2, and the width of the outer periphery of the coil 252 is Wy3, the relationship of Wy2<Wy1<Wy3 is satisfied. This is the same for the coil 253. Thus, by making the inner periphery of the coils 252 and 253 smaller than the profile of the permanent magnet 251, it is possible to suppress power loss (heat generation or the like) when applying a current to the coils 252 and 253. As a result, it is possible to generate a magnetic field from the coils 252 and 253 more efficiently with low power.

In addition, in a plan view seen from the Z-axis direction, the center (center of gravity) of the permanent magnet 251 and the center (center of gravity) of the coils 252 and 253 are almost the same, and the outer periphery of the permanent magnet 251 overlaps the coils 252 and 253. Therefore, the magnetic field generated from the coils 252 and 253 can be efficiently made to act on the permanent magnet 251.

In the driving mechanism 25 described above, it is possible to generate a magnetic field from the coils 252 and 253 by applying a driving signal (AC voltage) to the coils 252 and 253 from a voltage applying unit (not shown) and to swing (rotate) the movable section 22 around the swing axis J with respect to the support section 23 by making the generated magnetic field act on the permanent magnet 251. In addition, the optical axis of the image light LL is shifted by such swinging of the movable section 22, and an image is alternately displayed on the image display positions P1 and P2. Accordingly, since the apparent number of pixels is increased, it is possible to increase the resolution of the image.

As shown in FIGS. 4A and 4B and 6, the holding section 26 includes a first holding portion 261 located on the +Z-axis side with respect to the support section 23 and a second holding section 262 located on the −Z-axis side with respect to the support section 23. The first holding portion 261 includes a frame-shaped frame portion 261a that corresponds to the shape of the support section 23 and is bonded to the upper surface of the support section 23, a coil holding portion 261b that holds the coil 252 of the first driving mechanism 25A and is connected to the frame portion 261a, and a coil holding portion 261c that holds the coil 252 of the second driving mechanism 25B and is connected to the frame portion 261a. Similarly, the second holding section 262 includes a frame-shaped frame portion 262a that corresponds to the shape of the support section 23 and is bonded to the lower surface of the support section 23, a coil holding portion 262b that holds the coil 253 of the first driving mechanism 25A and is connected to the frame portion 262a, and a coil holding portion 262c that holds the coil 253 of the second driving mechanism 25B and is connected to the frame portion 262a.

Thus, in the present embodiment, the support section 23 is interposed between the frame portions 261a and 262a. Accordingly, since the support section 23 is reinforced by the frame portions 261a and 262a, the bending (deformation) of the support section 23 at the time of swinging of the movable section 22 is particularly reduced. Therefore, it is possible to swing the movable section 22 more stably. The method of bonding the frame portions 261a and 262a to the support section 23 is not particularly limited. Preferably, epoxy-based adhesives or acrylic-based adhesives are used. In this case, a relatively soft adhesive layer is formed between the frame portions 261a and 262a and the support section 23. Accordingly, since the stress applied to the support section 23 is reduced by the adhesive layer, it is possible to swing the movable section 22 more stably.

Each of the coil holding portions 261b and 261c holds the coil 252, and is connected to the frame portion 261a. Thus, in a configuration in which the coil 252 is fixed to the frame portion 261a (support section 23) through the coil holding portions 261b and 261c, the position of the coil 252 with respect to the permanent magnet 251 can be easily adjusted by adjusting the fixing positions of the coil holding portions 261b and 261c with respect to the support section 23. Therefore, it is possible to easily perform the positioning of the permanent magnet 251 and the coil 252. The method of connecting the coil holding portions 261b and 261c to the frame portion 261a is not particularly limited, and it is possible to use an adhesive, screwing, and recess-projection fitting, for example.

Each of the coil holding portions 261b and 261c holds the coil 252 from the side opposite to the permanent magnet 251. In other words, the coil holding portions 261b and 261c are provided so as not to be located between the permanent magnet 251 and the coils 252 and 253. Accordingly, it is possible to more accurately adjust the gap G between the permanent magnet 251 and the coils 252 and 253. In addition, it is possible to prevent contact between the permanent magnet 251 and the coil holding portions 261b and 261c when swinging the movable section 22.

Similar to the coil holding portions 261b and 261c, each of the coil holding portions 262b and 262c holds the coil 253, and is connected to the frame portion 262a. In addition, each of the coil holding portions 262b and 262c holds the coil 253 from the side opposite to the permanent magnet 251.

The holding section 26 (the frame portions 261a and 262a and the coil holding portions 261b, 261c, 262b, and 262c) having the above-described configurations are non-magnetic materials. Accordingly, since the formation of the magnetic path by the holding section 26 is suppressed, the magnetic field generated from the coils 252 and 253 can be efficiently made to act on the permanent magnet 251. Non-magnetic materials that form the holding section 26 are not particularly limited. For example, metal materials, such as aluminum, titanium, and some kinds of stainless steel, or resin materials, such as rubber and plastics, can be mentioned. Among these, it is preferable to use metal materials, such as aluminum and titanium. In this case, since the holding section 26 can be made thin and hard, it is possible to further reduce the thickness of the optical device 2 and to reinforce the support section 23 more firmly.

In the present embodiment, in the first holding portion 261, the frame portion 261a and the coil holding portions 261b and 261c are formed as separate bodies. However, the frame portion 261a and the coil holding portions 261b and 261c may be integrally formed.

Second Embodiment

Figure 8:
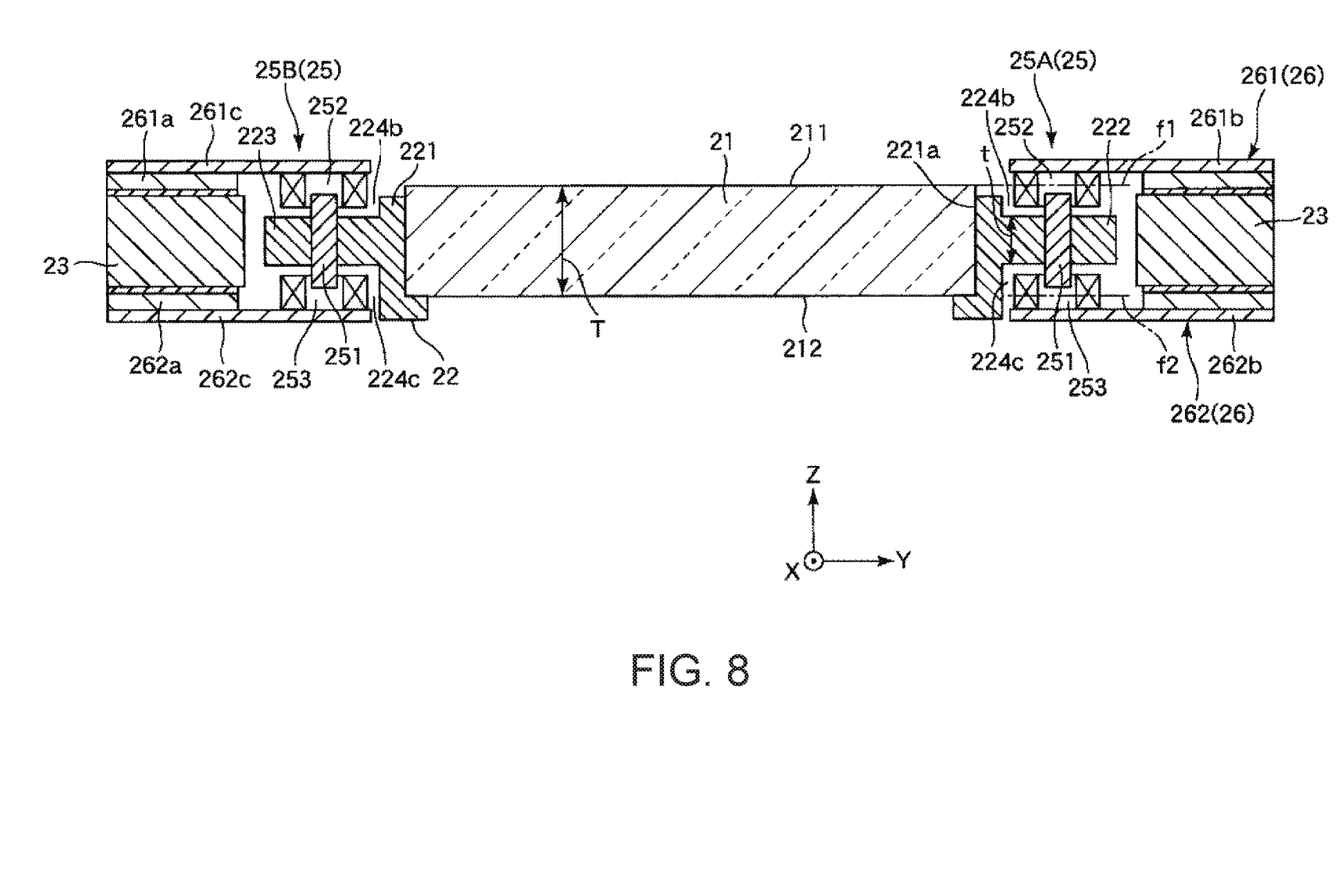
FIG. 8 is a sectional view of an optical device provided in an image display device according to a second embodiment of the invention.

FIG. 8 is a sectional view of an optical device provided in an image display device according to a second embodiment of the invention.

Hereinafter, the display device according to the second embodiment of the invention will be described. This explanation will be focused on differences from the above embodiment, and the same explanation will be omitted.

The image display device of the second embodiment is the same as that of the first embodiment described above except for the configuration of the optical device. In addition, the same components as in the embodiment described above are denoted by the same reference numerals.

As shown in FIG. 8, in the optical device 2 of the present embodiment, the thickness of the permanent magnet 251 is larger than the thickness t of the thin wall portion 222, and the upper and lower surfaces of the permanent magnet 251 protrude from the thin wall portion 222. In addition, each of the coils 252 and 253 is formed so as to have an inner diameter larger than the permanent magnet 251, so that a part of the permanent magnet 251 is inserted into the coils 252 and 253.

Also in the second embodiment, it is possible to obtain the same effects as in the first embodiment.

Third Embodiment

Figure 9:
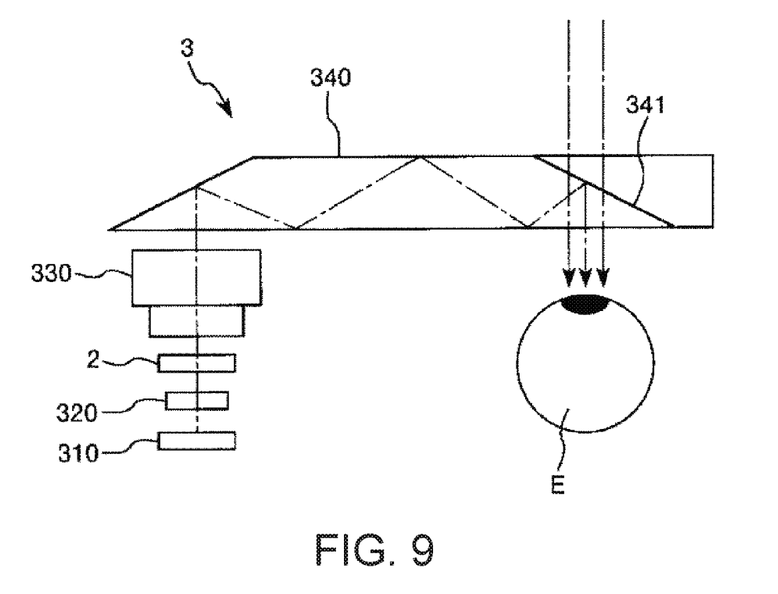
FIG. 9 is a diagram showing the optical configuration of an image display device according to a third embodiment of the invention.

FIG. 9 is a diagram showing the optical configuration of an image display device according to a third embodiment of the invention.

Hereinafter, the display device according to the third embodiment of the invention will be described. This explanation will be focused on differences from the above embodiment, and the same explanation will be omitted.

The image display device of the third embodiment is a semi-transmission type (see-through type) head mounted display (hereinafter, simply referred to as "HMD").

An image display device (HMD) 3 of the present embodiment is used in a state of being worn on the observer (user), and includes a light source 310, a liquid crystal display device 320, a projection lens system 330, a light guiding unit 340, and an optical device 2 as an optical path deflection element, as shown in FIG. 9. The light source 310 is not particularly limited. For example, it is possible to use an LED backlight. Light generated from the light source 310 is guided to the liquid crystal display device 320. The liquid crystal display device 320 is a transmission type liquid crystal display device. For example, a high-temperature polysilicon (HTPS) single-plate TFT color liquid crystal panel can be used. The liquid crystal display device 320 generates image light by modulating the light from the light source 310. The generated image light is incident on the light guiding unit 340 after being magnified by the projection lens system. The light guiding unit 340 has a plate shape, and a half mirror 341 is disposed on the downstream side in the propagation direction of light. Light guided into the light guiding unit 340 travels while repeating reflection, and is guided to the pupil E of the observer by the half mirror 341. At the same time, outside light is transmitted through the half mirror 341 and is guided to the pupil E of the observer. Accordingly, in the HMD 3, image light is superimposed on the background, and the result is viewed.

In the HMD 3 having such a configuration, the optical device 2 is disposed between the liquid crystal display device 320 and the projection lens system 330. Therefore, it is possible to shift the optical axis of the image light LL.

Also in the third embodiment described above, it is possible to obtain the same effects as in the first embodiment.

Fourth Embodiment

Figure 10:
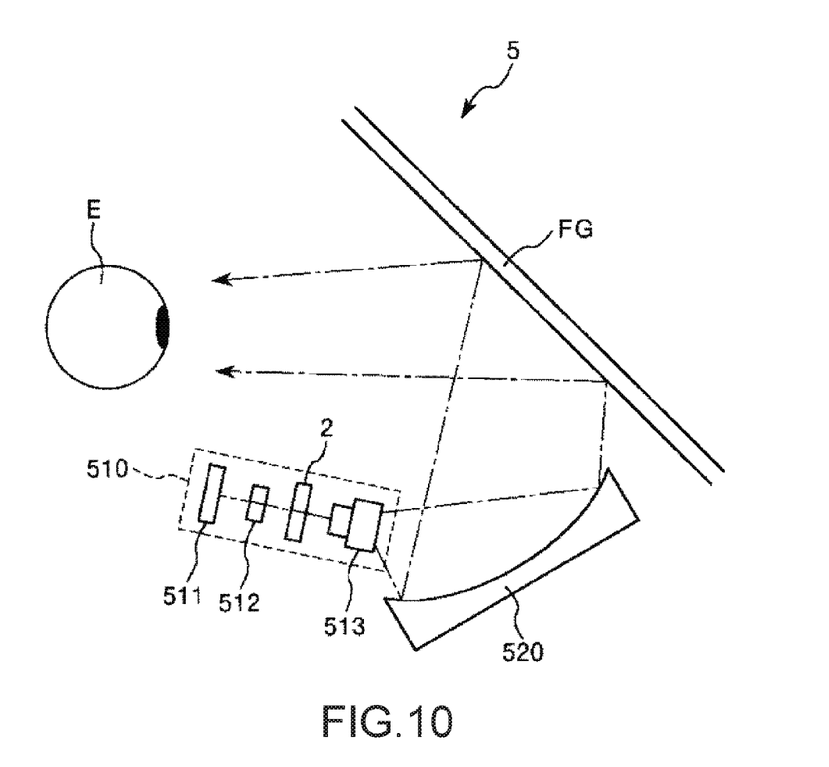
FIG. 10 is a diagram showing the optical configuration of an image display device according to a fourth embodiment of the invention.

FIG. 10 is a diagram showing the optical configuration of an image display device according to a fourth embodiment of the invention.

Hereinafter, the image display device according to the fourth embodiment of the invention will be described. This explanation will be focused on differences from the above embodiment, and the same explanation will be omitted.

The image display device of the fourth embodiment is a head-up display (hereinafter, simply referred to as "HUD").

An image display device (HUD) 5 of the present embodiment is mounted in, for example, an automobile, and is used to project various kinds of information (images), such as speed, time, and mileage, to the driver through a windshield FG. As shown in FIG. 10, the HUD 5 includes a projection unit 510, a reflecting mirror 520, and the optical device 2 as an optical path deflection element. The projection unit 510 includes a light source 511, a liquid crystal display device 512, and a projection lens system 513. The light source 511, the liquid crystal display device 512, and the projection lens system 513 can be formed so as to have the same configuration as the light source 310, the liquid crystal display device 320, and the projection lens system 330 of the third embodiment described above, for example. The reflecting mirror 520 is a concave mirror, and reflects projection light from the projection unit 510 to project (display) the reflected projection light onto the windshield FG.

In the HUD 5 having such a configuration, the optical device 2 is disposed between the liquid crystal display device 512 and the projection lens system 513. Therefore, it is possible to shift the optical axis of projection light.

Also in the fourth embodiment described above, it is possible to obtain the same effects as in the first embodiment.

While the optical device and the image display device according to the invention have been described based on the embodiments shown in the diagrams, the invention is not limited thereto. For example, in the optical device and the image display device according to the invention, the configuration of each section can be replaced with any configuration having the same function, and it is also possible to add other optional structures.

In the above embodiments, the LCD projector and the light scanning type projector have been described as image display devices. However, image display devices are not limited to projectors, and a printer, a scanner, and the like can also be applied.

The entire disclosure of Japanese Patent Application No. 2015-017657, filed Jan. 30, 2015 is expressly incorporated by reference herein.

What is claimed is:
1. An optical device, comprising:
a plate-shaped optical section that has a light incidence surface on which light is incident;
a movable section that supports the optical section;
a shaft section that supports the movable section so as to be swingable around a swing axis;
a support section that supports the shaft section;
a permanent magnet that is provided in the movable section and has a smaller thickness than a thickness of the optical section; and
a pair of coils that are disposed opposite to each other with the permanent magnet interposed therebetween and that generate a magnetic field to act on the permanent magnet,
wherein the movable section includes a thin wall portion having a smaller thickness than the thickness of the optical section,
the permanent magnet is disposed in the thin wall portion, and
when seen from a direction perpendicular to a plate thickness direction of the optical section, a surface of each of the pair of coils facing the permanent magnet is located between a pair of main surfaces of the optical section.

2. The optical device according to claim 1,
wherein a center of the shaft section in the plate thickness direction and a center of the permanent magnet in the plate thickness direction are located within the same plane perpendicular to the plate thickness direction of the optical section.

3. The optical device according to claim 2,
wherein the same plane crosses a center of the optical section in the plate thickness direction.

4. An image display device, comprising:
the optical device according to claim 3,
wherein a position of each pixel displayed by irradiation of the light is shifted by spatially modulating light in the optical device.

5. An image display device, comprising:
the optical device according to claim 2,
wherein a position of each pixel displayed by irradiation of the light is shifted by spatially modulating light in the optical device.

6. The optical device according to claim 1,
wherein each of the movable section and the shaft section contains a resin material.

7. An image display device, comprising:
the optical device according to claim 6,
wherein a position of each pixel displayed by irradiation of the light is shifted by spatially modulating light in the optical device.

8. The optical device according to claim 1, further comprising:
a first holding section that is fixed to the support section and holds one of the coils; and
a second holding section that is fixed to the support section and holds the other coil,
wherein the support section is interposed between the first and second holding sections.

9. The optical device according to claim 8,
wherein each of the first and second holding sections is a non-magnetic material.

10. An image display device, comprising:
the optical device according to claim 9,
wherein a position of each pixel displayed by irradiation of the light is shifted by spatially modulating light in the optical device.

11. An image display device, comprising:
the optical device according to claim 8,
wherein a position of each pixel displayed by irradiation of the light is shifted by spatially modulating light in the optical device.

12. The optical device according to claim 1,
wherein a surface of each of the pair of coils facing the permanent magnet is spaced apart from the permanent magnet in the plate thickness direction.

13. An image display device, comprising:
the optical device according to claim 12,
wherein a position of each pixel displayed by irradiation of the light is shifted by spatially modulating light in the optical device.

14. The optical device according to claim 1,
wherein the light is transmitted through the optical section.

15. An image display device, comprising:
the optical device according to claim 14,
wherein a position of each pixel displayed by irradiation of the light is shifted by spatially modulating light in the optical device.

16. An image display device, comprising:
the optical device according to claim 1,
wherein a position of each pixel displayed by irradiation of the light is shifted by spatially modulating light in the optical device.

* * * * *